June 7, 1938.  J. Y. BLAZEK ET AL  2,120,198
GRINDING MACHINE
Filed July 23, 1934  3 Sheets-Sheet 1

INVENTORS.
J. Y. BLAZEK
AND
R. G. ANDERSON
BY
C. F. Heinkel,
ATTORNEY.

June 7, 1938.  J. Y. BLAZEK ET AL  2,120,198
GRINDING MACHINE
Filed July 23, 1934   3 Sheets-Sheet 3

INVENTORS
J. Y. BLAZEK
AND
R. G. ANDERSON
BY
C. F. Heinkel
ATTORNEY.

Patented June 7, 1938

2,120,198

UNITED STATES PATENT OFFICE 2,120,198

GRINDING MACHINE

John Y. Blazek and Russell G. Anderson, Maple Heights, Ohio, assignors to Lempco Products, Inc., Bedford, Ohio Application July 23, 1934, Serial No. 736,496

11 Claims. (Cl. 51—50)

The present invention relates to improvements in grinding machines and grinding operations on work.

Objects of the present invention are:

To provide a grinding machine with means for holding and rotating and indexing work for successively operating on different surfaces thereof by one grinding wheel.

To provide such a machine with a turret-like element which does the work holding and work indexing.

To provide such a machine with a work rotating means located mainly within the turret-like element.

To provide such a machine with an individual driving means for rotating work therein.

To provide such a machine with an individually driven grinding wheel.

To provide such a machine with an axially movable quill to carry the grinding wheel spindle.

To provide such a machine with means whereby rotation of work in the turret-like element is stopped and started by axial movement of the sleeve.

To provide such a machine with an adjusting means for locating work in the turret-like element.

To provide such a machine with manually operated work gripping and work releasing means.

To provide such a machine with a manually controlled turret and manually controlled feeding of the grinding wheel.

Further objects will be pointed out during the description of the machine shown in the accompanying drawings, or will become obvious or apparent or will suggest themselves upon an inspection of the accompanying drawings and this specification.

The present invention is illustrated in this application as being applied to or used for grinding valves although it is quite obvious that the same can be used for grinding other work.

In the accompanying drawings, forming part of this specification:

Similar reference characters refer to similar parts throughout the views.

Figure 1:
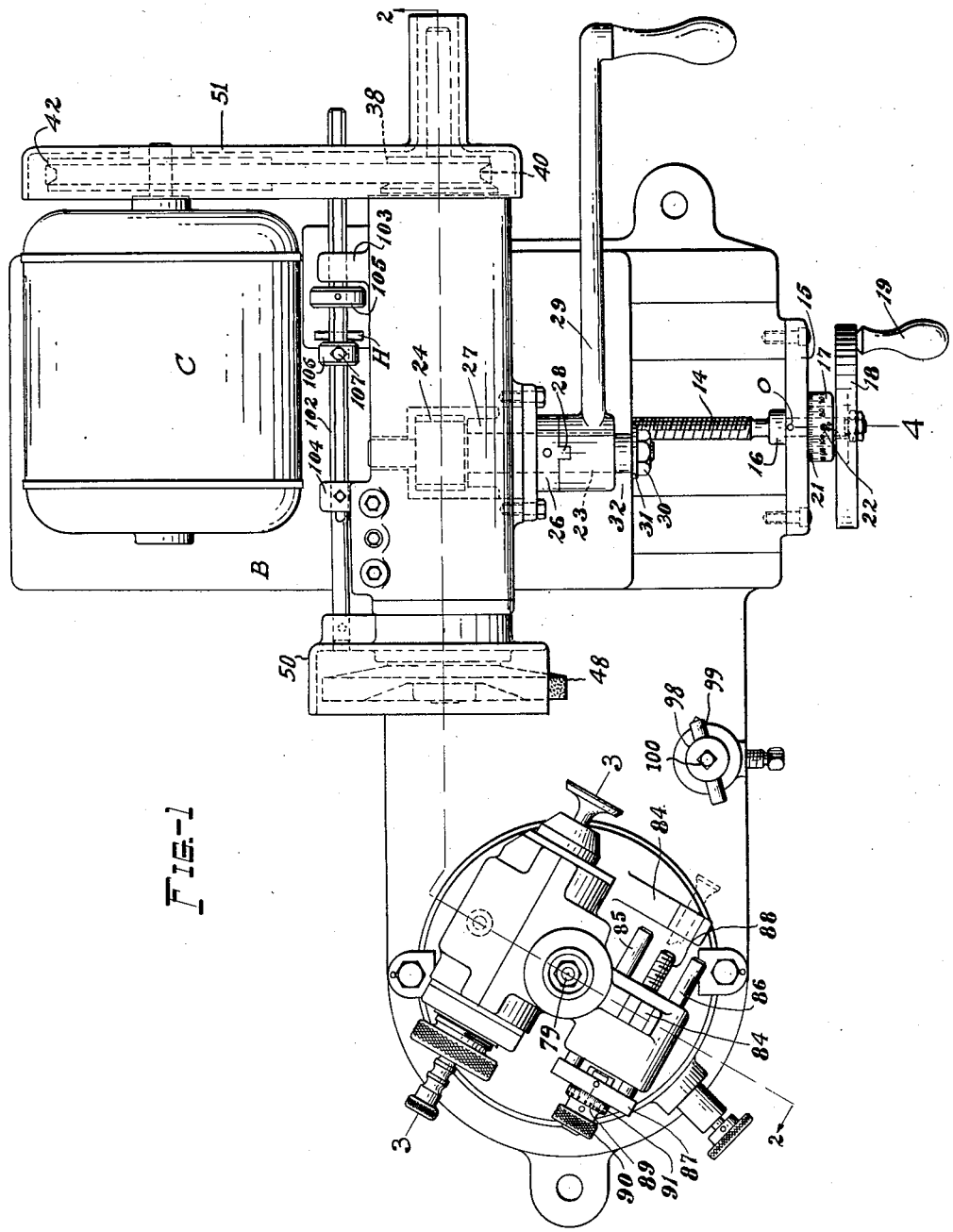
Fig. 1 is a plan view of a valve grinding machine adapted to grind the bevel valve seat on the head of the valve and also the other end thereof.
Figure 2:
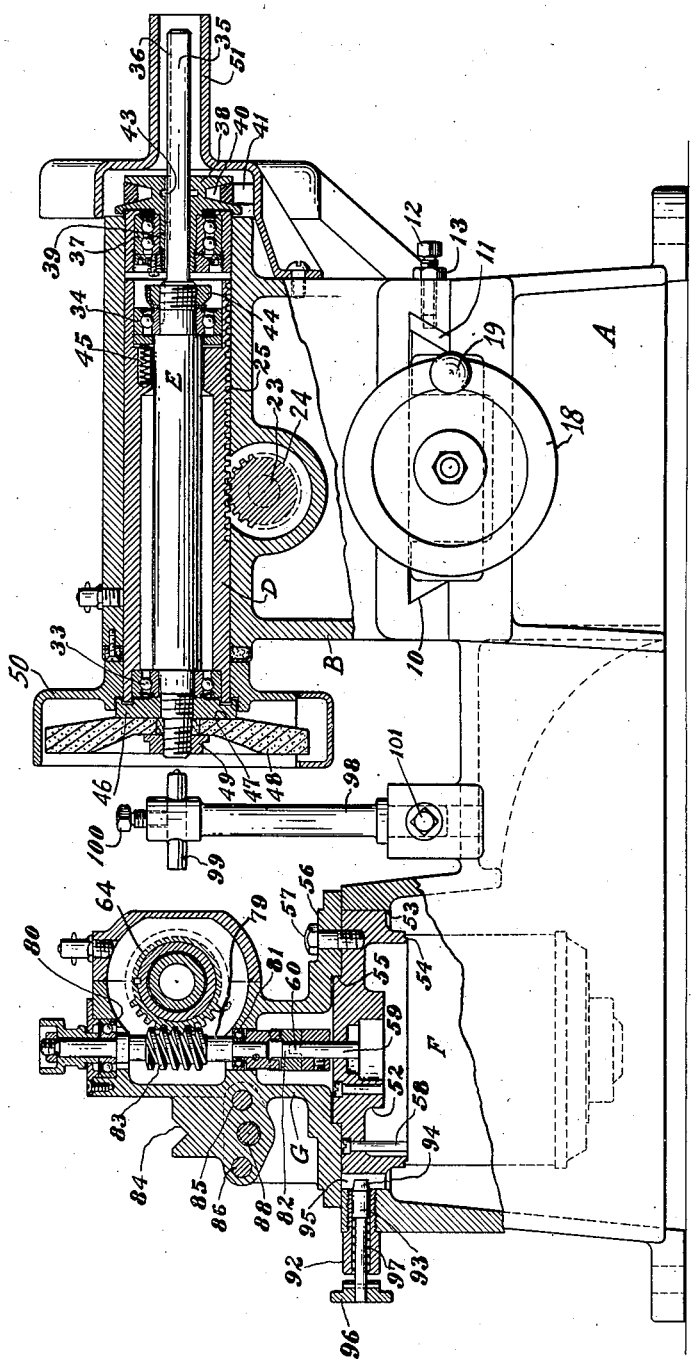
Fig. 2 is a vertical section, longitudinally of the machine, taken on line 2—2 of Fig. 1.
Figure 3:
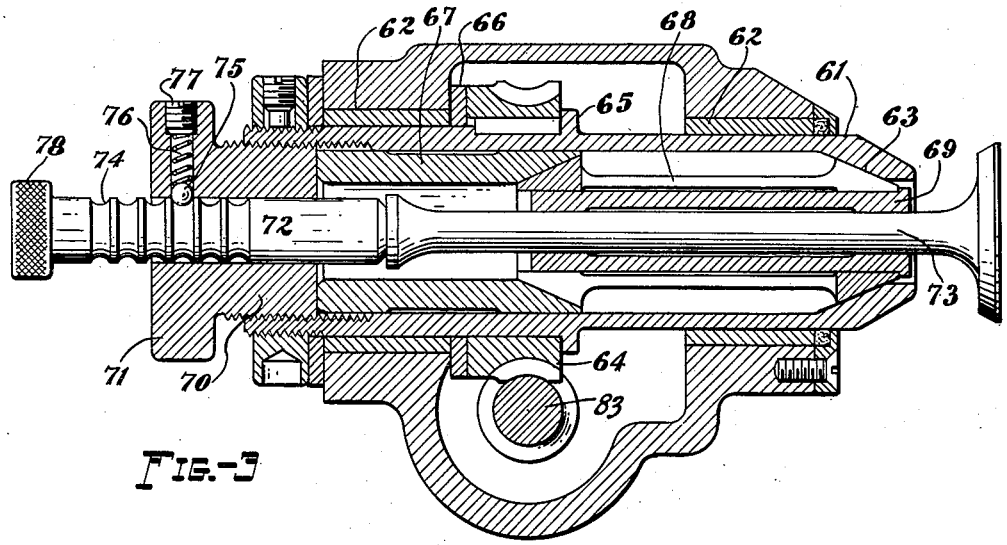
Fig. 3 is an enlarged section taken on line 3—3 of Fig. 1 and shows the work gripping and work rotating and work adjusting more clearly.
Figure 4:
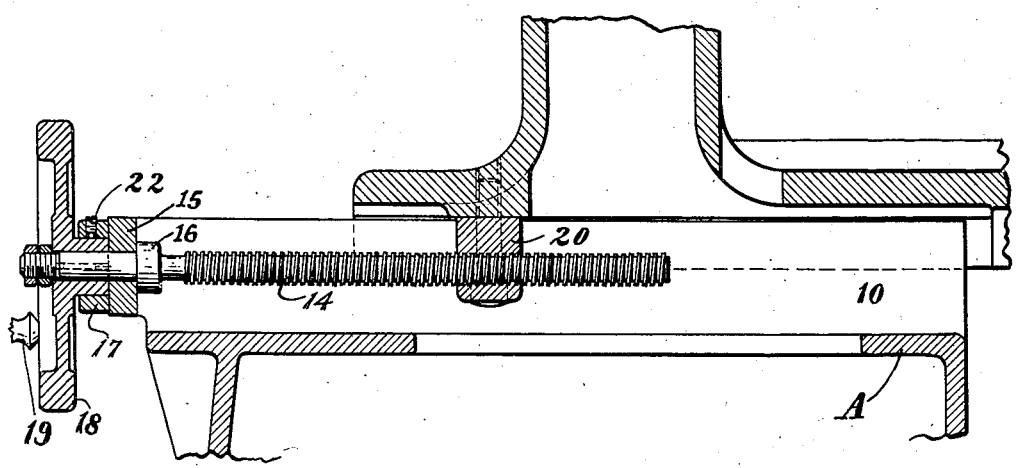
Fig. 4 is an enlarged section taken on the line 4 of Fig. 1 and shows the mechanism for moving the carriage and the grinding wheel more clearly.

A specific description of the grinding machine shown in the accompanying drawings, embodying the present invention in a valve grinding machine for illustration of the present invention now follows:

The bed A is of sufficiently sturdy design to deaden or eliminate as far as is possible the vibrations usually produced in machines especially in grinding machines wherein the high speed rotation of grinding wheels produces vibrations quite easily unless the bed and framing of the machine is made quite sturdy so that the work produced by the machine will be true and smooth. The top of the bed A has the guide ways 10.

The carriage B telescopes over the guide ways 10 and is guided thereby in its travel transversely of the bed. The gib 11 is introduced between the carriage and one of the guide ways and the set screw 12 is tapped into the bed and abuts the gib 11 to take up all lost motion there between the carriage and the bed. The lock nut 13 is threaded onto the screw 12 and abuts the bed to retain the screw in adjusted position and thereby holds the gib in adjusted relation to the carriage.

The carriage extends some distance toward the rear of the machine and has the grinding wheel driving motor C mounted on the top of the rear portion thereof so that the motor moves with the carriage transversely of the bed for purposes appearing hereinbelow.

The screw 14 is journaled in the plate 15 which is rigidly secured to the bed to form a substantial part thereof. The collar 16 is integral with the screw 14 and abuts the inner face of the plate 15. The collar 17 is held to the screw 14 to rotate therewith and abuts the outer face of the plate 15. A zero mark 0 is placed on the top of the plate 15 and the outer circumference of the collar 17 is graduated, appropriate to the pitch of the thread on the screw 14, so that the amount or distance of movement by the screw can be read and determined easily. The handwheel 18 is secured to the screw 14 to rotate therewith and to rotate the same and has the handle 19 secured thereon to facilitate rotation of the screw. The screw 14 is externally threaded to engage in the internally threaded nut 20 rigidly secured to the underside of the carriage so that rotation of the screw moves the carriage and the grinding wheel and the motor thereon transversely of the bed to bring the latter into operative relation with work in the turret. The graduations 21 assist in determining the distance which the carriage has moved or is being moved by the rotation of the screw 14. The screw 22 is threaded into the collar 17 and the inner end thereof is abuttable on the screw 14 for securing the collar in a certain relation rotatively of the screw. This is of advantage when the grinding wheel is to be moved a certain distance which movement can be determined by rotating the collar 17 on the screw, after releasing the screw 22, to a number of graduations corresponding to the distance to which the grinding wheel is to be moved, then locking the collar 17 by means of the screw 22 and then rotating the screw until the selected graduation meets the 0 mark. By this means, the movement of the grinding wheel is predetermined and tends to accuracy of the machine and eliminates the cut and try method of sizing work and thereby saves considerable time in grinding of work.

The quill D is closely fitted in the carriage B with the axis thereof longitudinally of the bed and transversely of the guide ways 10 and is axially movable therein. The shaft 23 is journaled in the carriage B, transversely of the axis of the quill, and has the pinion 24 thereon, the teeth of which mesh with the teeth 25 on one side of the quill so that rotation of the shaft 23 moves the quill axially. The collar 26 is pinned to the shaft 23, the inner end thereof abuts the carriage to prevent endwise movement of the shaft in the carriage in one direction and one end of the pinion 24 abutting the inner end of the plug 27 rigidly secured to the carriage and substantially integral therewith, to prevent endwise movement of the shaft in the carriage. The collar 26 has the outwardly extending clutch teeth 28 thereon.

The quill moving handle 29 is journaled on and movable longitudinally on the outer end of the shaft 23 and has notches therein to engage with the clutch teeth 28 so that the shaft 23 can thereby be rotated manually. The nut 30 is threaded onto the outer end of the shaft 23 and by means of the washer 31 held against a shoulder on the shaft 23 by the nut 30, prevents the handle from being pulled from the shaft endwise. There is the space 32 between the washer 31 and the outer end of the hub of the handle so that the handle can be moved longitudinally of the shaft to manually release the clutch teeth and notch engagement and to manually engage the clutch teeth and notches when desired.

The grinding wheel carrying spindle E is journaled in the unrotatable quill D by means of the ball bearings 33 and 34 and has the diametrically reduced part 35 at the outer end thereof and the keyway 36 therein. The part 35 is journaled in the carriage by means of the ball bearing 37. The grinding wheel driving pulley 38 has the sleeve-like hub 39 carrying the inner race of the ball bearing 37. The V groove 40 in the pulley 38 engages with the belt 41 which also engages with a similarly grooved pulley 42 on and rotatable with the armature shaft of the motor C. The hub of the pulley 38 has secured therein the key 43 engaging with the keyway 36 to rotate the spindle E when the motor C is operating. When the quill moves the spindle E axially, the diametrically reduced part 35 slides back and forth in the hub of the pulley 38 which is held against movement away from the carriage B so that the pulley 38 and the belt 41 always retain the same relation to the pulley 42. The nut 44 is threaded onto the spindle E and holds the ball bearing 34 against a shoulder on the shaft. The springs 45 are countersunk into the quill endwise to exert pressure therein against ball bearing 34 and thence against the nut 44 tending to retain the operating end of the spindle E in a definite relation to the front end of the quill to prevent undesired axial movement of the spindle relative to the quill.

The flange 46 is threaded onto the front end of the spindle E to hold the ball bearing in place and to form the abutment wall 47 for the grinding wheel 48 which is mounted on the spindle E and held thereon by the flanged nut 49 threaded onto the spindle E. The casing 50 for the grinding wheel is mounted on the front end of the quill. The guard casing 51 is secured to the outer end of the carriage to inclose, as far as possible, the rotating pulley 38 and the moving belt 41 and the rotating spindle end 35.

The flange member 52 is journaled in the bore 53 provided in the bed and has the motor centralizing pilot 54 on the lower end thereof. The work rotating motor F has a recess in one end thereof engaging with the pilot 54 to centralize the motor relative to the flange 52 and to extend the same downwardly and into the bed and is enclosed therein.

The turret G has the centralizing recess in the bottom thereof to engage with the pilot 55 extending upwardly from the flange 52. The flange 56 of the turret abuts the top of the flange 52 and also the top of the bed. The screws 57 hold the turret to the top of the flange 52 and to the top of the bed and the screws 58 hold the motor F to the flange 52. The armature shaft 59 is journaled in the flange 52 and has the tongue 60 on the upper end thereof.

The work receiving hollow sleeve 61 is journaled in the turret by means of the bushings 62. The front end of the sleeve has the internal taper wall 63 and the rear end thereof is internally and externally threaded. The worm wheel 64 is keyed on to the sleeve 61 to rotate therewith. One end of the worm wheel 64 abuts the collar 65 integral with the sleeve and the other end abuts the washer 66 in internal abutment on the turret to retain the sleeve in endwise relation to the turret. The sleeve 67 fits axially movably into the hollow sleeve 61 and may also rotate therein when occasion demands. The sleeve 68 is slitted axially and the slits opening alternately from the opposite ends of the sleeve. One end of the sleeve 68 is of a taper corresponding to the taper wall in the sleeve 61 and the other end is tapered corresponding to the taper of the taper wall in the sleeve 67 so that axial movement of the sleeve 67 contracts the sleeve 68 or permits the self expanding thereof according to the direction of movement of the sleeve 67.

The work gripping sleeve 69 is also slitted axially so that the same can expand and contract, is preferably self expanding so that the same can contract to grip work therein or expand to release the work according to axial movement of the sleeve 67 and consequent diametrical movement of the sleeve 68 described above.

The plug 70 is threaded into the internal thread in the sleeve 61 and the inner end thereof abuts the outer end of the sleeve 67 so that rotative movement of the plug moves the sleeves 67 and 68 axially with consequent gripping and releasing of work as above described. The plug 70 has the diametrically enlarged head 71 for ease of manual manipulation of the work gripping element. The end abutment member 72 extends slidably through the plug 70 for axial adjustment thereof and the inner end thereof abuts the end of the stem of the valve 73. A series of grooves 74 are provided on the abutment member 72 and are axially spaced thereon to accommodate different lengths of valve stems. The ball 75 is mounted in the abutment member 72 and is pressed into the corresponding groove by the spring 76 held in abutment on the ball by the screw 77 threaded into the abutment member 72. A manual axial pull or push on the abutment member moves the ball into the abutment member during adjustment of the end of the adjusting member. When one of the grooves comes opposite the ball, the spring 76 seats the ball in that groove and retains the abutment member 72 against axial self movement. The head 78 is provided on the end of the abutment member for easy and convenient manual movement of the same.

The worm shaft 79 is journaled in the turret by means of the ball bearings 80 and 81 and the axis of this shaft is in alinement with the axis of the motor F. The slot 82 traverses the lower end of the shaft 79 to engage with the tongue 60 for driving the shaft 79 by the motor and easy assembling and disassembling of the turret and the motor. The worm threads 83 are provided on the shaft 79 to mesh with the teeth on the worm wheel 64 so that the sleeve and work and mechanism therein and thereon will be rotated when the armature shaft of the motor F rotates. The axis of the sleeve 61 is spaced to one side of the axis of the worm shaft 79 which is also the axis upon which the turret pivots.

On the opposite side of this axis of pivot of the turret is another work receiving element in the form of the V block 84. The axes of the sleeve 61 and of the V block 84 are parallel in the instance shown and described. When faces are to be ground angular to that shown, the axes of the sleeve 61 or of the V block 84 may be relatively inclined to attain that end.

The laterally spaced guide posts 85 and 86 are each axially movable in the turret, below the V block, and are connected by the work abutting bar 87 which has the zero mark 0 on the upper side face thereof. The adjusting screw 88 is threaded through the turret, below the V block and substantially midway between the guide posts and is journaled in the work abutting bar. The collar 89, integral with the head 90, has the graduations 91 thereon appropriate to the pitch of the thread on the screw 88 so that adjustment of the bar 87 can easily be seen and determined without any other measuring instrument.

The stub 92 is threaded into the turret and in a shoulder abutment thereon and has a part thereof projecting outwardly of the turret. The index pin 93 extends through and fits axially slidably in the stub 92. The inner end of the index pin 93 has the nose 94 formed to engage the notches 95 in the flange 58. In the present instance, the notches are diametrically opposite and there are two positive stations to which the turret can be indexed. The number of notches can be increased or decreased when a different number of stations are required.

The head 96 is pinned to the index pin 93 for ease and convenient manual operation of the index pin. One end of the spring 97 abuts a shoulder in the stub 92 and the other end thereof abuts a shoulder on index pin and normally tends to retain the nose 94 in the corresponding notch.

The post 98 extends from the top of the bed and has the wheel dressing element 99 mounted in the top thereof to move transversely therein for adjustment thereof relative to the grinding wheel. The screw 100 is for locking the wheel dressing element in adjusted position. The screw 101 is for holding the post 98 against rotation and also in vertical adjustment when such is necessary.

The bar 102 has one end thereof pinned to the casing for the grinding wheel and extends through the bosses 103 and 104 on the carriage. The collar 105 is pinned to the bar 102 to form a stop means for backward movement of the grinding wheel. The collar 106 is adjustably telescoped over the bar 102 and is movable longitudinally of the bar 102 and adapted to be held in adjusted position on the bar by the set screw 107.

The motors C and F are connected to the same source of electricity but each has its own leads from this source. A switch is introduced in the circuit for the motor F and the part H of this switch extends upwardly sufficiently far to be contacted by the collar 106.

The axis of the turret is located at one side of the axis of the grinding wheel so that the latter can operate on work in the turret.

The grinding wheel with its sleeve is moved transversely of the bed by the screw 14 which moves the carriage transversely of the bed and is moved longitudinally of the bed by the handle 29. Both of these movements are attained manually to bring the grinding wheel into operative relation with the work in the turret. These same manual movements also bring the grinding wheel into wheel dressing relation with the wheel dresser 99.

A valve 73, to be machined, is inserted endwise into the work holding sleeve 61 while the work gripping mechanism therein is expanded by manipulation of the plug 70 until the end of the valve stem abuts the inner end of the abutment member 72 whereupon the valve is gripped in the sleeve 61 with the end thereof in abutment on the member 72 and the head of the valve projecting some distance out of and beyond the outside of the turret.

The turret is then manually indexed so that the head of the valve is located toward the grinding wheel. The axis of the work holding element is then angular with the axis of the grinding wheel substantially as shown.

The grinding wheel is then brought to operate on the valve head by means of the handwheel 18 and the handle 19. The grinding wheel is then moved back and forth over the bevel surface of the valve head so that the outer circumferential surface of the grinding wheel moves over the bevel surface of the valve head and thereby grinds the same to the bevel shown; the turret being indexed to attain that bevel. The switch for the motor F is then closed so that the motor rotates the work in the turret. When the grinding of the bevel surface is finished, the grinding wheel is moved backward sufficiently far until the collar 106 contacts and moves the switch part H and thereby opens the switch in the circuit for the motor F and stops the motor and thereby stops rotation of the work in the turret. The work is then released by rotative movement of the plug 70 so that the finished valve can easily be removed from the turret and a new one inserted in place thereof and gripped in the turret as above described.

The valve is then reversed so that the head thereof is inwardly of the turret and is laid into the V groove in the blocks 84 so that the head of the valve abuts endwise on the abutment 87 and the end of the stem of the valve extends out of the turret as shown. The turret is then manually indexed to bring the outer end of the stem into operative relation for the grinding wheel which is then brought forward manually by means of the handle 29 so that the outer flat face of the grinding wheel is in line with the end of the valve stem. The grinding wheel is then moved transversely of the bed by means of the handwheel 18 to feed the end face thereof across the end of the valve stem. The indexing of the turret is arranged so that the axis of the V blocks is parallel with the axis of the grinding wheel when the end of the valve stem is to be machined square to the axis of the valve. When angularity is desired for the end of the valve stem, relative to the axis thereof, the indexing of the turret must be changed accordingly either by adjustment of the turret about its pivot axis or by changing the index notches in the flange 52. When the grinding wheel is being brought forwardly for operation of valves or other work, the switch member H is released, the switch closes the circuit of the motor F, and the work is thereby rotated in the turret.

The machine shown and described is economical of structure, easy and convenient of operation, grips and automatically rotates work in the turret and automatically stops rotation of the work when grinding thereof is finished. All operating means of the machine are manually operated except the driving of the grinding wheel and the rotation of the work in the turret.

It is quite obvious that changes of structure and arrangement of the parts, from that shown and described can be made within the scope and spirit and intent of the present invention and of the appended claims. Therefore, having shown and described our invention and without limiting ourselves to the precise structure and arrangement of parts as is shown and described herein,

We claim:

1. In a grinding machine, a bed, a grinding wheel carrying carriage guided to slide transversely of said bed, a quill unrotatable but axially movable in said carriage longitudinally of said bed and transversely of the guiding slide for said carriage and having a rack thereon, a shaft journaled in said carriage and having a pinion thereon engaging with said rack for movement of said quill, an operating handle journaled on and movable axially on said shaft, cooperating clutch teeth between said shaft and said handle to effect engagement of said handle with said shaft for rotation of said shaft and axial movement of said quill and to effect release of said handle from said shaft for individual rotation of said handle, and a work holding turret on said bed and adapted to simultaneously hold a plurality of work pieces and being spaced to bring the work therein into position for operation thereon by said grinding wheel.

2. In a grinding machine, a bed, a grinding wheel movable transversely and longitudinally of said bed, an indexable work holding turret mounted on said bed and adapted to simultaneously hold a plurality of work pieces and being in cooperating relation to said grinding wheel and having indexing notches therein, and a manually operated retaining means for said turret when the same is indexed and releasing means for permitting indexing of said turret comprising, a stub threaded into said bed, a turret retaining and releasing pin axially movable in said stub, the inner end of said pin formed to engage with said notches, a manually take hold collar on the outer end of said pin, a shoulder on said pin, a shoulder on said stub, and a spring between said shoulders to normally hold said inner end of said pin in one of said notches.

3. In a grinding machine, a bed, a grinding wheel movable transversely and longitudinally of said bed, a work holding turret on said bed and adapted to simultaneously hold a plurality of work pieces and being in cooperative relation to said grinding wheel, and a manually operated gripping means for holding work in said turret comprising, a sleeve in said turret and having an internal taper wall at one end thereof and an external and an internal thread at the other, a second sleeve axially movable within said sleeve and having an internal taper wall at the inner end thereof, a radially self expanding work gripping member within said sleeve adjacently to said second sleeve, one end of said member conforming to and engaging with said taper wall in said sleeve and the other end thereof conforming to and engaging with said taper wall in said second sleeve, a manually operated work gripping and releasing plug threaded into said internal thread to move said second sleeve axially and thereby move said work gripping member axially for gripping and releasing of work, a take hold means on said plug for ease of rotating the same, an abutment member for the ends of work extending through said plug, an adjusting means between said abutment member and said plug to adjustably vary the axial relation of work to said turret, means in said plug for retaining said abutment member in adjusted position, and a lock nut threaded onto said external thread in said sleeve and abutting on said turret to retain said sleeve in relation to said turret.

4. A bed sturdy to mitigate vibrations produced therein, a driven work grinding wheel mounted on said bed to move transversely and longitudinally thereof, a work receiving turret on said bed and being pivotally indexable about the axis of the turret, work holding means on said turret for simultaneously holding each of a plurality of work pieces at a side of the axis of pivot of said turret, one of said work holding means including a rotatable sleeve journaled in said turret and having means to grip a work piece intermediate the ends thereof, a power means for rotating said sleeve, a manually operated means for indexing said turret, a manually operated means for moving said grinding wheel on said bed, a manually operated means for gripping and releasing the work piece in said sleeve, and means operated by a definite movement of said grinding wheel relative to said bed to start and stop rotation of said sleeve by said power means.

5. In a valve grinding machine, a bed, a carriage guided on said bed to move transversely thereof, an unrotatable quill axially movably supported in said carriage, a grinding wheel carrying shaft journaled in said quill, a motor on said carriage for driving said shaft, a turret indexable about a fixed axis on said bed and having means for simultaneously holding two sidewise spaced valves at opposite sides of the axis of pivot of the turret and in end for end relations and thereby leaving exposed the head end of one valve and the tail end of the other for successive operation thereon by the grinding wheel after corresponding indexing of said turret, and means engaging said quill for moving the grinding wheel into and out of grinding relations with the corresponding ends of the valves.

6. In a grinding machine, a bed, a work grinding wheel movable transversely and longitudinally on said bed for operating on work in the machine, a turret pivotally indexable on said bed, work holding means on said turret each sidewise of the axis of pivot of said turret and the axis of each angular with the axis of pivot of said turret, said work holding means simultaneously holding the work pieces in end for end relationship and leaving opposite ends of each exposed for operation thereon by said grinding wheel, and means for moving said grinding wheel into operative relationship with the corresponding end of one of the work pieces in said turret after each indexing of said turret.

7. A bed, a grinding wheel positionally and reciprocatively movable on said bed, an indexable turret on said bed in co-operative relationship with said grinding wheel, two laterally spaced work receiving elements in said turret, both eccentric with the axis of indexing of said turret, each to receive a similar work piece one with one end thereof directed toward said grinding wheel and the other with the corresponding end thereof directed away from said grinding wheel, means to index said turret to definite stops thereof and thereby successively presenting opposite ends of the work pieces in said turret for operation on opposite ends by said grinding wheel, and means for moving said grinding wheel into operative relationship with the corresponding ends of the work pieces.

8. A bed, a carriage movable transversely on said bed, a grinding wheel and driving motor therefor mounted on said carriage, a grinding wheel carrier unrotatable and axially movable in said carriage, a driving connection between said motor and said grinding wheel, a turret indexable on said bed and being in spaced relation to said grinding wheel, a plurality of work receiving means in said turret and the axis of each being eccentric and angular with the axis of indexing of said turret, means to index said turret for bringing parts of the work pieces in said turret into operative relation with said grinding wheel, and means for moving said grinding wheel into and out of grinding relation with the work pieces held in said turret.

9. A bed, a carriage guided to move transversely of said bed, a grinding wheel and a driving motor therefor mounted on said carriage, said grinding wheel being axially movable relative to said carriage, a screw journaled in said bed and in threaded engagement with said carriage for moving said grinding wheel into position for operating on work in the machine, a turret indexable on said bed and having spaced work holding elements each eccentric with the axis of indexing of the turret and each angular with said axis and leaving an end of each work piece exposed for operation thereon by said grinding wheel, and means for indexing said turret to successively bring the exposed parts of the work pieces in said turret into position for operation thereon by said grinding wheel.

10. A bed, a grinding wheel movable transversely to and longitudinally reciprocatingly relative to said bed, a turret in a position on said bed and being indexable about the axis thereof, work holding elements on said turret sidewise of the axis of pivot of said turret, the axes of the work holding elements being angular with the axis of pivot of said turret, at least one of said work holding elements being rotatable, each of said work holding elements leaving one end of the work piece therein exposed for operation thereon by said grinding wheel, and a rotating means for said one work holding element comprising: a work gripping sleeve rotatable in said turret and having a worm wheel thereon, a shaft journaled in said turret and having a worm thereon in mesh with said worm wheel, a motor carried by said turret, and one end of the armature shaft of said motor in driving relation with said shaft.

11. In a grinding machine, a vertical bed having a horizontal top, a grinding wheel mounted on said top to move longitudinally and transversely thereon, an indexable turret mounted on said top in spaced relationship with said grinding wheel, means in said turret for simultaneously holding a number of cylindrical work pieces independent of each other and sidewise of and angular to the axis of pivot of said turret and leaving both ends of each exposed, one of said work holding means being rotatable, means for rotating said one work holding means, means on the outside of said turret for manually gripping a work piece therein, means on the outside of said turret for manually indexing the same, said indexing successively bringing respective ends of the work pieces in said turret into position for operating thereon by said grinding wheel, and a moving means for manually bringing said grinding wheel into operative relationship with the exposed ends of the work pieces in said turret.

JOHN Y. BLAZEK.
RUSSELL G. ANDERSON.